(12) United States Patent
Nakashima et al.

(10) Patent No.: US 11,912,881 B2
(45) Date of Patent: Feb. 27, 2024

(54) INK COMPOSITION FOR PHOTO-CURABLE INK JET PRINTING

(71) Applicant: SAKATA INX CORPORATION, Osaka (JP)

(72) Inventors: Okinori Nakashima, Osaka (JP); Takuya Myose, Osaka (JP); Kazuhiro Fuke, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 301 days.

(21) Appl. No.: 17/298,318

(22) PCT Filed: Oct. 1, 2019

(86) PCT No.: PCT/JP2019/038724
§ 371 (c)(1),
(2) Date: May 28, 2021

(87) PCT Pub. No.: WO2020/137067
PCT Pub. Date: Jul. 2, 2020

(65) Prior Publication Data
US 2022/0041879 A1  Feb. 10, 2022

(30) Foreign Application Priority Data
Dec. 25, 2018 (JP) .................. 2018-241265

(51) Int. Cl.
*C09D 11/38* (2014.01)
*C09D 11/101* (2014.01)
*C09D 11/107* (2014.01)

(52) U.S. Cl.
CPC ............ *C09D 11/38* (2013.01); *C09D 11/101* (2013.01); *C09D 11/107* (2013.01)

(58) Field of Classification Search
CPC ..... C09D 11/38; C09D 11/101; C09D 11/107; C09D 11/322; C09D 11/30
See application file for complete search history.

(56) References Cited

U.S. PATENT DOCUMENTS

| | | | |
|---|---|---|---|
| 2003/0083396 A1* | 5/2003 | Ylitalo | C09D 11/101 522/74 |
| 2008/0316244 A1 | 12/2008 | Lugassi et al. | |
| 2011/0236647 A1 | 9/2011 | Tsuchiya et al. | |
| 2017/0158890 A1 | 6/2017 | Hirose et al. | |
| 2019/0062580 A1 | 2/2019 | Nakashima et al. | |

FOREIGN PATENT DOCUMENTS

| | | |
|---|---|---|
| CN | 108699367 A | 10/2018 |
| EP | 1970417 A1 | 9/2008 |
| EP | 2366748 A2 | 9/2011 |
| JP | 2007-314632 | 12/2007 |
| JP | 2008050600 | 3/2008 |
| JP | 2009-35650 | 2/2009 |
| JP | 2011-52107 | 3/2011 |
| JP | 2011-241323 | 12/2011 |
| JP | 2013159708 A | 8/2013 |
| JP | 2014-240464 | 12/2014 |
| JP | 2016-20457 | 2/2016 |
| JP | 2016196655 | 11/2016 |
| JP | 2017-537986 | 12/2017 |
| JP | 2018-122431 | 8/2018 |
| WO | 2016/050371 | 4/2016 |
| WO | 2016/050372 | 4/2016 |
| WO | 2016/050504 | 4/2016 |
| WO | 2016179213 A1 | 11/2016 |
| WO | 2017/145671 | 8/2017 |

OTHER PUBLICATIONS

Supplementary European Search Report issued in EP 19904799, dated Aug. 10, 2022.
International Search Report issued in PCT/JP2019/038724, dated Nov. 5, 2019.
Chinese Office Action issued in Chinese Application No. 201980085418.8, dated Apr. 25, 2022.
International Preliminary Report on Patentability issued in PCT/JP2019/038724, dated Jun. 16, 2021.

\* cited by examiner

*Primary Examiner* — Jessica M Roswell
(74) *Attorney, Agent, or Firm* — ICE MILLER LLP

(57) ABSTRACT

Disclosed is an ink composition for photo-curable ink jet printing, comprising (A) at least one selected from the group consisting of hexanediol acrylate, 3-methyl-1,5-pentanediol diacrylate, dipropylene glycol diacrylate, and hydroxy pivalic acid neopentyl glycol diacrylate, (B) at least one of vinyl amide monomer and acryloyl amine monomer, (C) an acrylated amine compound having two photopolymerizable functional groups and two amino groups in a molecule, (D) a monofunctional monomer (excluding vinyl amide monomer which is the (B) component), and a photopolymerization initiator, wherein a content of the (A) component is 40 to 70% by mass, wherein a content of the (B) component is 5 to 30% by mass, wherein a content of the (C) component is 0.1 to 15% by mass, and wherein a viscosity is 200 mPa·s or less.

4 Claims, No Drawings

INK COMPOSITION FOR PHOTO-CURABLE INK JET PRINTING

CROSS-REFERENCE TO RELATED PATENT APPLICATIONS

This is a U.S. National Phase Application under 35 U.S.C. § 371 of International Patent Application No. PCT/JP2019/038724, filed Oct. 1, 2019, and claims priority to Japanese Patent Application No. 2018-241265, filed Dec. 25, 2018, which is incorporated by reference in its entirety. The International Application was published on Jul. 2, 2020, as International Publication No. WO 2020/137067 A1.

TECHNICAL FIELD

The present invention relates to an ink composition for photo-curable ink jet printing. More specifically, the present invention relates to an ink composition for photo-curable ink jet printing capable of obtaining a printed matter which exhibits an excellent adhesiveness to a polyolefin-based resin base material such as polypropylene and which is excellent in various physical properties such as abrasion resistance.

BACKGROUND ART

Conventionally, an ink composition for photo-curable ink jet printing which is cured by ultraviolet rays, electron beams, or other radioactive rays has been developed. Patent Document 1 discloses an active energy ray-curable inkjet ink comprising a monofunctional monomer having a cyclic structure, a bifunctional monomer, and an organic solvent having a predetermined boiling point.

PRIOR ART DOCUMENT

Patent Document

Patent Document 1: JP 2008-50600 A
Patent Document 2: JP 2016-196655 A

SUMMARY OF THE INVENTION

However, the ink compositions described in Patent Documents 1 and 2 have room for improvement in adhesiveness to a polyolefin-based base material such as polypropylene and curability. Moreover, printed matters obtained by using the ink compositions described in these Patent Documents have room for improvement in abrasion resistance.

The present invention has been made in view of such conventional problems, and it is an object of the present invention to provide an ink composition for photo-curable ink jet printing capable of obtaining a printed matter which exhibits an excellent adhesiveness to a polyolefin-based resin base material such as polypropylene and which is excellent in various physical properties such as abrasion resistance.

As a result of intensive studies to solve the above-described problems, the present inventors have found that the above-described problems can be solved by using (A) at least one selected from the group consisting of hexanediol acrylate, 3-methyl-1,5-pentanediol diacrylate, dipropylene glycol diacrylate, and hydroxy pivalic acid neopentyl glycol diacrylate, (B) at least one of vinyl amide monomer and acryloyl amine monomer, (C) an acrylated amine compound having two photopolymerizable functional groups and two amino groups in a molecule, (D) a monofunctional monomer (excluding vinyl amide monomer which is the (B) component), and a photopolymerization initiator in combination in a predetermined amount and maintaining the viscosity to be below a predetermined level, and completed the present invention.

The ink composition for photo-curable ink jet printing according to one aspect of the present invention that solves the above-described problems comprises (A) at least one selected from the group consisting of hexanediol acrylate, 3-methyl-1,5-pentanediol diacrylate, dipropylene glycol diacrylate, and hydroxy pivalic acid neopentyl glycol diacrylate, (B) at least one of vinyl amide monomer and acryloyl amine monomer, (C) an acrylated amine compound having two photopolymerizable functional groups and two amino groups in a molecule, (D) a monofunctional monomer (excluding vinyl amide monomer which is the above-described (B) component), and a photopolymerization initiator, wherein a content of the above-described (A) component is 40 to 70% by mass in the ink composition for photo-curable ink jet printing, wherein a content of the above-described (B) component is 5 to 30% by mass in the ink composition for photo-curable ink jet printing, wherein a content of the above-described (C) component is 0.1 to 15% by mass in the ink composition for photo-curable ink jet printing, and wherein a viscosity at 25° C. is 200 mPa·s or less.

Embodiment for Carrying Out the Invention

<Ink Composition for Photo-Curable Ink Jet Printing>

The ink composition for photo-curable ink jet printing according to one embodiment of the present invention (hereinafter, also referred to as an ink composition) comprises (A) at least one selected from the group consisting of hexanediol acrylate, 3-methyl-1,5-pentanediol diacrylate, dipropylene glycol diacrylate, and hydroxy pivalic acid neopentyl glycol diacrylate, (B) at least one of vinyl amide monomer and acryloyl amine monomer, (C) an acrylated amine compound having two photopolymerizable functional groups and two amino groups in a molecule, (D) a monofunctional monomer (excluding vinyl amide monomer which is the (B) component described above), and a photopolymerization initiator. A content of the (A) component is 40 to 70% by mass in the ink composition for photo-curable ink jet printing. A content of the (B) component is 5 to 30% by mass in the ink composition for photo-curable ink jet printing. A content of the (C) component is 0.1 to 15% by mass in the ink composition for photo-curable ink jet printing. A viscosity at 25° C. is 200 mPa·s or less. Each will be described below.

((A) Component)

The ink composition of the present embodiment comprises at least one selected from the group consisting of hexanediol acrylate, 3-methyl-1,5-pentanediol diacrylate, dipropylene glycol diacrylate, and hydroxy pivalic acid neopentyl glycol diacrylate, as a (A) component. When the ink composition comprises a (A) component, it is excellent in that it exhibits an excellent adhesiveness to a polyolefin-based resin base material such as polypropylene and is excellent in various physical properties such as abrasion resistance as compared with the case where the ink composition does not comprise a (A) component but comprises other polyfunctional acrylates. Among them, the ink composition preferably comprises hexanediol acrylate as a (A) component.

The content of the (A) component may be 40% by mass or more, preferably 45% by mass or more, in the ink composition. The content of the (A) component may be 70% by mass or less, preferably 60% by mass or less, in the ink composition. When the content of the (A) component is less than 40% by mass, the ink composition tends to have a reduced abrasion resistance of a printed matter to be obtained when printed on a polyolefin-based resin base material. On the other hand, when the content of the (A) component exceeds 70% by mass, the ink composition tends to have a reduced adhesiveness to a polyolefin-based resin base material.

((B) Component)

The ink composition of the present embodiment comprises at least one of vinyl amide monomer and acryloyl amine monomer as a (B) component. When the ink composition comprises a (B) component, the ink composition is excellent in curability. Moreover, a printed matter to be obtained is excellent in abrasion resistance.

The vinyl amide monomer is not particularly limited. As way of an example, examples of the vinyl amide monomer include N-vinyl-2-pyrrolidone, N-vinylcaprolactam, N-vinylacetamide, N,N'-divinylethyleneurea, and the like. The vinyl amide monomer may be used in combination.

The acryloyl amine monomer is not particularly limited. As way of an example, examples of the acryloyl amine monomer include N-acryloyl morpholine and the like. The acryloyl amine monomer may be used in combination.

In the present embodiment, the (B) component preferably comprises at least one of N-vinylcaprolactam and acryloyl morpholine. Thereby, the ink composition is capable of obtaining a printed matter which exhibits more excellent adhesiveness to a polyolefin-based resin base material such as polypropylene and which is more excellent in various physical properties such as abrasion resistance.

The content of the (B) component may be 5% by mass or more in the ink composition. The content of the (B) component may be 30% by mass or less, preferably 20% by mass or less, in the ink composition. When the content of the (B) component is less than 5% by mass, the ink composition tends to have a reduced curability. On the other hand, when the content of the (B) component exceeds 30% by mass, the ink composition tends to have a reduced abrasion resistance of a printed matter to be obtained when printed on a polyolefin-based resin base material.

((C) Component)

The ink composition of the present embodiment comprises an acrylated amine compound having two photopolymerizable functional groups and two amino groups in a molecule as a (C) component. When the ink composition comprises a (C) component, the ink composition is excellent in ejection stability and curability.

The acrylated amine compound having two photopolymerizable functional groups and two amino groups in the molecule is not particularly limited. By way of an example, examples of the photopolymerizable functional group include a functional group capable of polymerizing with visible light or invisible light including ionizing radiation such as ultraviolet rays and electron beams to form a cross-linking bond between molecules. Moreover, examples of the photopolymerizable functional group include both a photopolymerizable functional group in a narrow sense which is directly activated by photoirradiation to undergo a photopolymerization reaction and a photopolymerizable functional group in a broad sense in which a photopolymerization reaction is initiated and promoted by action of active species generated from the photopolymerization initiator when the photopolymerizable functional group and the photopolymerization initiator are allowed to coexist and photo-irradiate.

Examples of the photopolymerizable functional group include those having a photo-radical polymerization reactivity such as an ethylenic double bond, those having a photo-cationic polymerization reactivity and a photo-anionic polymerization reactivity with a cyclic ether group, etc. such as an epoxy group, and the like. Among them, the photopolymerizable functional group is preferably an ethylenic double bond such as a (meth)acryloyl group, a vinyl group, and an allyl group, more preferably a (meth)acryloyl group. In a photopolymerizable compound, it is preferable that both of two photopolymerizable functional groups are (meth)acryloyl groups and an amine value is 130 to 142 KOHmg/g. Besides, in the present embodiment, the amine value means an amine value per 1 g of a solid content, calculated as an equivalent of potassium hydroxide after measurement by potentiometric titration (e.g., COMTITE (AUTO TITRATOR COM-900, BURET B-900, TITSTATIONK-900) manufactured by HIRANUMA Co., Ltd.) using a 0.1 N aqueous hydrochloric acid.

The photopolymerizable compound is preferably an acrylated amine compound obtained by reacting a bifunctional (meth)acrylate with an amine compound. The bifunctional (meth)acrylate is alkylene glycol di(meth)acrylate such as 1,4-butanediol di(meth)acrylate, 1,6-hexanediol di(meth)acrylate, 1,9-nonanediol di(meth)acrylate, propylene glycol di(meth)acrylate, 1,3-butylene glycol di(meth)acrylate, and neopentyl glycol di(meth)acrylate, di(meth)acrylate of bisphenol alkylene oxide adduct such as di(meth)acrylate of ethylene oxide adduct of bisphenol A, di(meth)acrylate of ethylene oxide adduct of bisphenol F, di(meth)acrylate of ethylene oxide adduct of bisphenol S, di(meth)acrylate of ethylene oxide adduct of thiobisphenol, and di(meth)acrylate of ethylene oxide adduct of brominated bisphenol A, polyalkylene glycol di(meth)acrylate such as polyethylene glycol di(meth)acrylate and polypropylene glycol di(meth)acrylate, di(meth)acrylate of hydroxy pivalic acid neopentyl glycol ester, or the like. Among them, the bifunctional (meth)acrylate is preferably 1,6-hexanediol di(meth)acrylate.

The amine compound is a monofunctional amine compound such as benzylamine, phenethylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine, and n-octadecylamine, a polyfunctional amine compound such as diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthanediamine, bis(4-amino-3-methylcyclohexylnomethane), isophoronediamine, 1,3-diaminocyclohexane, and spiroacetal-based diamine, or the like. Moreover, the amine compound may be a high molecular weight type of polyfunctional amine compound such as polyethyleneimine, polyvinylamine, and polyallylamine.

The acrylated amine compound is preferably a compound obtained by reacting 1,6-hexanediol di(meth)acrylate with an amine compound. Specifically, the acrylated amine compound is CN371 (manufactured by Sartomer), EB7100 (EBECRYL 7100, manufactured by Cytec Industries Inc.), Agi008 (manufactured by DSM), or the like.

The content of the (C) component may be 0.1% by mass or more, preferably 0.5% by mass or more, in the ink composition. Moreover, the content of the (C) component may be 15% by mass or less, preferably 8% by mass or less, in the ink composition. When the content of the (C) component is less than 0.1% by mass, the ink composition tends to have a reduced curability. On the other hand, when the content of the (C) component exceeds 15% by mass, the ink composition tends to have a reduced ejection stability.

((D) Component)

The ink composition of the present embodiment comprises a monofunctional monomer (excluding vinyl amide monomer which is the (B) component) as a (D) component.

The monofunctional monomer is not particularly limited. By way of an example, examples of the monofunctional monomer include cyclohexyl acrylate, tetrahydrofurfuryl acrylate, 4-t-butylcyclohexyl acrylate, caprolactone-modified tetrahydrofurfuryl acrylate, methoxyacrylate, ethoxyacrylate, t-butyl acrylate, isobutyl acrylate, 2-ethylhexyl acrylate, isooctyl acrylate, isostearyl acrylate, stearyl acrylate, isoamyl acrylate, trimethylol propane formal monoacrylate, trifluoroethyl acrylate, dipropylene glycol diacrylate, hydroxyphenoxyethyl acrylate, hydroxyphenoxypropyl acrylate, 2-hydroxyethyl acrylate, 2-hydroxypropyl acrylate, 4-hydroxybutyl acrylate, β-carboxyethyl acrylate, benzyl acrylate, methylphenoxyethyl acrylate, 2-phenoxyethyl acrylate (and its ethylene oxide and/or propylene oxide addition monomer), phenoxydiethylene glycol acrylate, 1,4-cyclohexanedimethanol monoacrylate, 2-methoxyethyl acrylate, methoxytriethylene glycol acrylate, 2-ethoxyethyl acrylate, 3-methoxybutyl acrylate, ethoxyethoxyethyl acrylate, butoxyethyl acrylate, methoxydipropylene glycol acrylate, dipropylene glycol acrylate, ethoxylated succinic acid acrylate, ω-carboxypolycaprolactone monoacrylate, isobornyl acrylate, and the like. These monofunctional monomers may be used in combination.

A content of the (D) component is preferably 5% by mass or more in the ink composition. Moreover, the content of the (D) component is preferably 30% by mass or less in the ink composition. When the content of the (D) component is within the above-described ranges, the ink composition can be adjusted to a required viscosity and has an advantage of an excellent adhesiveness to a polyolefin-based resin base material such as polypropylene and of excellent various physical properties such as abrasion resistance.

In the ink composition of the present embodiment, a molar ratio ($M_D/M_B$) of a total molar amount $M_B$ of the (B) component and a total molar amount $M_D$ of the (D) component is preferably 0.1 or more. Moreover, the molar ratio ($M_D/M_B$) is preferably 3 or less, more preferably 2 or less, and further preferably 1 or less. When the molar ratio ($M_D/M_B$) is within the above-described ranges, the ink composition has an advantage of a good curability.

(Photopolymerization Initiator)

The photopolymerization initiator is not particularly limited. By way of an example, examples of the photopolymerization initiator include an acylphosphine-based photopolymerization initiator, a triazine-based photopolymerization initiator, and the like. The photopolymerization initiator may be used in combination.

The acylphosphine-based photopolymerization initiator is a photopolymerization initiator comprising an acylphosphine group, and the triazine-based photopolymerization initiator is a photopolymerization initiator having a triazine structure. These photopolymerization initiators have optical absorption property over the whole wavelength range of 450 to 300 nm, and are irradiated with light of these specific wavelengths (UV-LED) to polymerize the ink composition to become a macromolecule.

The acylphosphine-based photopolymerization initiator is
2,4,6-trimethylbenzoyldiphenylphosphine oxide,
2,6-dimethoxybenzoyldiphenylphosphine oxide,
2,6-dichlorobenzoyldiphenylphosphine oxide,
2,3,5,6-tetramethylbenzoyldiphenylphosphine oxide,
2,6-dimethylbenzoyldimethylphosphine oxide,
4-methylbenzoyldiphenylphosphine oxide,
4-ethylbenzoyldiphenylphosphine oxide,
4-isopropylbenzoyldiphenylphosphine oxide,
1-methylcyclohexanoylbenzoyldiphenylphosphine oxide,
bis(2,4,6-trimethylbenzoyl)-phenylphosphine oxide,
2,4,6-trimethylbenzoylphenylphosphinic acid methyl ester,
2,4,6-trimethylbenzoylphenylphosphinic acid isopropyl ester,
bis(2,6-dimethoxybenzoyl)-2,4,4-trimethylpentylphosphine oxide,
bis(2,6-dimethoxybenzoyl)-2,3,3-trimethyl-pentylphosphine oxide, or the like. More specifically, the photopolymerization initiator is TPO as 2,4,6-trimethylbenzoyldiphenyl-phosphine oxide (manufactured by Lamberti S.p.A.), IRGACURE819 as bis(2,4,6-trimethylbenzoyl)-phenylphosphine oxide (manufactured by BASF), or the like.

The triazine-based photopolymerization initiator is
2,4,6-trichloro-s-triazine, 2-phenyl-4,6-bis(trichloromethyl)-s-triazine,
2-(p-methoxyphenyl)-4,6-bis(trichloromethyl)-s-triazine,
2-(p-tolyl)-4,6-bis(trichloromethyl)-s-triazine,
2-pipenyl-4,6-bis(trichloromethyl)-s-triazine,
2,4-bis(trichloromethyl)-6-styryl-s-triazine,
2-(naphth-1-yl)-4,6-bis(trichloromethyl)-s-triazine,
2-(4-methoxy-naphth-1-yl)-4,6-bis(trichloromethyl)-s-triazine,
2,4-trichloromethyl-(piperonyl)-6-triazine,
2,4-trichloromethyl(4'-methoxystyryl)-6-triazine, or the like.

A content of the photopolymerization initiator is preferably 3% by mass or more, more preferably 4% by mass or more, in the ink composition. Moreover, the content of the photopolymerization initiator is preferably 15% by mass or less, more preferably 10% by mass or less, in the ink composition. When the content of the photopolymerization initiator is within the above-described ranges, the ink composition can be appropriately cured.

(Sensitizer)

The ink composition for photo-curable ink jet printing of the present embodiment further has optical absorption property mainly in a wavelength range of ultraviolet rays of 400 nm or more and can be used in combination with a photosensitizer (compound) which expresses a sensitizing function of a curing reaction by light with a wavelength in the range in order to promote curability against ultraviolet rays using a light emitting diode (LED) as a light source. Besides, "expressing a sensitizing function by light with a wavelength of 400 nm or more" as describe above means having optical absorption property in the wavelength range of 400 nm or more. By using such sensitizer, LED curability of the ink composition for photo-curable ink jet printing of the present invention can be promoted.

Examples of the photosensitizer include an anthracene-based sensitizer, a thioxanthone-based sensitizer, and the like, preferably a thioxanthone-based sensitizer. The photosensitizer may be used in combination. Specifically, examples of the photosensitizer include an anthracene-based sensitizer such as 9,10-dibutoxyanthracene, 9,10-diethoxyanthracene, 9,10-dipropoxyanthracene, and 9,10-bis(2-ethylhexyloxy)anthracene, a thioxanthone-based sensitizer such as 2,4-diethylthioxanthone, 2-isopropylthioxanthone, and 4-isopropylthioxanthone, and the like. Typical examples of commercially available products include DBA and DEA (manufactured by Kawasaki Kasei Chemicals Ltd.) as anthracene-based sensitizers, DETX and ITX (manufactured by Lambson Ltd.) as thioxanthone-based sensitizers, and the like.

When a photosensitizer is compounded, a content of the photosensitizer is preferably more than 0 and 5.0% by mass or less in the ink composition. When the content of the photosensitizer exceeds 5.0% by mass, an effect of compounding the photosensitizer is less likely to improve, and there is a tendency for excessive addition.

In addition, when a thioxanthone-based sensitizer is used as a photosensitizer, the ink composition tends to turn yellow. Therefore, the ink composition has a more yellowish hue than a color based on a pigment (original hue), and thus it is preferable to appropriately determine a content of the thioxanthone-based sensitizer for each color. Specifically, in a white ink composition and a clear ink composition that are easily affected by changes in color, the ink composition preferably does not comprise a thioxanthone-based sensitizer as a photosensitizer. Moreover, in a magenta ink composition and a cyan ink composition, a vinylamide compound is used in combination as a photopolymerizable compound, and thus a cured coating film that has turned yellow fades in color, and a change in hue tends to become a problem. Therefore, it is preferable to use a photosensitizer to an extent where there is no problem in hue. Furthermore, a black ink composition and a yellow ink composition are less likely to affect hue even if they are discolored, and they have a poorer photopolymerizability than other hues, and thus it is preferable to use a thioxanthone-based sensitizer in combination as a photopolymerization initiator.

(Colorant)

The ink composition of the present embodiment preferably comprises a colorant. When the ink composition comprises a colorant, it can prepare ink compositions of each color.

The colorant is not particularly limited. As way of an example, it is preferable that the colorant can use conventionally used pigments and dyes without particular limitation and is a pigment such as an organic pigment and an inorganic pigment. The colorant may be used in combination.

Examples of the organic pigment include a dye lake pigment, azo-based, benzoimidazolone-based, phthalocyanine-based, quinacridone-based, anthraquinone-based, dioxazine-based, indigo-based, thioindigo-based, perylene-based, perinone-based, diketo-pyrrolo-pyrrole-based, isoindolinone-based, nitro-based, nitroso-based, anthraquinone-based, flavanthrone-based, quinophthalone-based, pyranthrone-based, and indanthrone-based pigments, and the like.

Examples of the inorganic pigment include a colored pigment such as titanium oxide, red oxide, antimony red, cadmium yellow, cobalt blue, ultramarine blue, navy blue, iron black, chrome oxide green, carbon black, and graphite (including achromatic color pigments such as white and black) and an extender pigment such as calcium carbonate, kaolin, clay, barium sulfate, aluminum hydroxide, and talc, and the like.

Specific examples of pigments for each representative hue of the ink composition of the present embodiment are as follows. A yellow pigment is C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, or the like, preferably C. I. Pigment Yellow 150, 155, 180, 213, or the like.

A magenta pigment is C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, or the like, preferably C. I. Pigment Red 122, 202, Pigment Violet 19, or the like.

A cyan pigment is C. I. Pigment Blue 1, 2, 3, 15, 15:1, 15:2, 15:3, 15:4, 15:6, 16, 18, 22, 27, 29, 60, or the like, preferably C. I. Pigment Blue 15:4 or the like.

A black pigment is carbon black (C. I Pigment Black 7) or the like.

A white pigment is titanium oxide, aluminum oxide, or the like, preferably titanium oxide surface-treated with various materials such as alumina and silica or, the like.

A content of the colorant is preferably 1% by mass or more in the ink composition. Moreover, the content of the colorant is preferably 20% by mass or less in the ink composition. When the content of the colorant is within the above-described ranges, the ink composition has an appropriate image quality of a printed matter to be obtained and is excellent in viscosity property.

(Pigment Dispersant)

A pigment dispersant is appropriately compounded in order to improve the dispersibility of the pigment and the storage stability of the ink composition.

The pigment dispersant is not particularly limited. By way of an example, examples of the pigment dispersant include a carbodiimide-based dispersant, a polyesteramine-based dispersant, a fatty acid amine-based dispersant, a modified polyacrylate-based dispersant, a modified polyurethane-based dispersant, a multi-chain polymer nonionic dispersant, a polymer ion activator, and the like. The pigment dispersant may be used in combination.

When the pigment dispersant is compounded, a content of the pigment dispersant is not particularly limited. The content of the pigment dispersant is preferably 1 to 200% by mass when the content of the pigment is 100% by mass. When the content of the pigment dispersant is within the above-described ranges, an ink composition to be obtained is excellent in storage stability.

(Surfactant)

A surfactant is appropriately compounded in order to improve the ejection stability of the ink composition. The surfactant is not particularly limited. As way of an example, examples of the surfactant include a silicone-based surfactant, an acetylene glycol-based surfactant, a fluorine-based surfactant, and the like. The surfactant may be used in combination.

Examples of the silicone-based surfactant include a polyether-modified silicone oil, a polyester-modified polydimethylsiloxane, a polyester-modified methylalkylpolysiloxane, and the like.

When a surfactant is compounded, a content of the surfactant is not particularly limited. The content of the surfactant is preferably 0.005 to 1.0% by mass in the ink composition. When the content of the surfactant is within the above-described ranges, an ink composition to be obtained has an appropriately adjusted surface tension and is less likely to include bubbles, improving the ejection stability.

(Other Optional Components)

The ink composition of the present embodiment may be compounded with various additives in order to express various functionalities, if necessary. Examples of optional components include, for example, a light stabilizer, a surface treatment agent, an antioxidant, an anti-aging agent, a cross-linking accelerator, a polymerization inhibitor, a plasticizer, a preservative, a pH adjusting agent, an anti-forming agent, moisturizing agent, and the like.

Returning back to the description of the entire ink composition, the ink composition of the present embodiment may have a viscosity of 300 mPa·s or less, preferably 20 mPa·s or less, at 25° C. The ink composition is compounded with a viscosity modifier and the like, if necessary, so that the viscosity becomes 200 mPa·s or less. Besides, in the present embodiment, the viscosity can be measured at 25° C. using an E-type viscometer (RE100L-type viscometer, manufactured by Toki Sangyo Co., Ltd.).

<Preparation Method of Ink Composition>

A method of preparing the ink composition of the present embodiment is not particularly limited. As way of an example, the ink composition can be prepared by adding all of the above-described materials and mixing them with a bead mill, a three-roll mill, or the like. Besides, when a pigment is compounded, the ink composition may be prepared by mixing the pigment, the above-described pigment dispersant and the photopolymerizable compound to obtain a contour base ink in advance and adding remainder amounts of the above-described components thereto so as to have desired composition.

<Manufacturing Method of Printed Matter>

Next, a method of manufacturing a printed matter using the ink composition of the present embodiment will be described.

The method of manufacturing the printed matter of the present embodiment includes a step of printing the above-described ink composition on a base material by an ink jet method.

The base material is not particularly limited. As way of an example, examples of the base material include each resin base material, paper, capsule, gel, metal foil, glass, wood, cloth, and the like. Among them, the ink composition of the present embodiment is capable of obtaining a printed matter which exhibits an excellent adhesiveness to a polyolefin-based resin base material such as polypropylene and polyethylene when printed thereon and which is excellent in curability and abrasion resistance.

A method of curing the ink composition is not particularly limited. As way of an example, the ink composition can be cured by being ejected onto a base material followed by being exposed to light. Specifically, ejection onto the base material can be performed by supplying the above-described ink composition to a printer head of a printer for an ink jet method and ejecting it from this printer head to the base material so that the film thickness of the coating film becomes 1 to 20 μm. Exposure and curing with light (curing of an image) can be performed by irradiating an ink composition coated on a base material as an image with light.

The light source that irradiates with light is not particularly limited. As way of an example, examples of the light source include ultraviolet rays, electron beams, visible rays, light emitting diodes (LEDs), and the like.

As described above, according to the ink composition of the present embodiment, it is possible to obtain a printed matter which exhibits an excellent adhesiveness to a polyolefin-based resin base material such as polypropylene and which is excellent in various physical properties such as abrasion resistance.

As described above, one embodiment of the present invention has been described. The present invention is not particularly limited to the above-described embodiment. Besides, the above-described embodiment mainly describes inventions having the following configurations.

(1) An ink composition for photo-curable ink jet printing, comprising (A) at least one selected from the group consisting of hexanediol acrylate, 3-methyl-1,5-pentanediol diacrylate, dipropylene glycol diacrylate, and hydroxy pivalic acid neopentyl glycol diacrylate, (B) at least one of vinyl amide monomer and acryloyl amine monomer, (C) an acrylated amine compound having two photopolymerizable functional groups and two amino groups in a molecule, (D) a monofunctional monomer (excluding vinyl amide monomer which is the (B) component described above), and a photopolymerization initiator, wherein a content of the (A) component is 40 to 70% by mass in the ink composition for photo-curable ink jet printing, wherein a content of the (B) component is 5 to 30% by mass in the ink composition for photo-curable ink jet printing, wherein a content of the (C) component is 0.1 to 15% by mass in the ink composition for photo-curable ink jet printing, and wherein a viscosity at 25° C. is 200 mPa·s or less.

According to such configuration, the ink composition for photo-curable ink jet printing is capable of obtaining a printed matter which exhibits an excellent adhesiveness to a polyolefin-based resin base material such as polypropylene and which is excellent in various physical properties such as abrasion resistance.

(2) The ink composition for photo-curable ink jet printing of (1), wherein the (B) component comprises at least one of N-vinylcaprolactam and acryloyl morpholine.

According to such configuration, the ink composition for photo-curable ink jet printing is capable of obtaining a printed matter which is excellent in curability, exhibits more excellent adhesiveness to a polyolefin-based resin base material such as polypropylene, and is more excellent in various physical properties such as abrasion resistance (3) The ink composition for photo-curable ink jet printing of (1) or (2), wherein a molar ratio ($M_D/M_B$) of a total molar amount $M_B$ of the (B) component and a total molar amount $M_D$ of the (D) component is 0.1 to 3.

According to such configuration, the ink composition for photo-curable ink jet printing has a higher resistance such as abrasion resistance and a higher adhesiveness to polyethylene and polypropylene base materials.

(4) The ink composition for photo-curable ink jet printing of any one of (1) to (3), further comprising a colorant.

According to such configuration, the ink composition for photo-curable ink jet printing has an advantage of being capable of preparing ink compositions of each color.

EXAMPLES

Hereinafter, the present invention will be described in more detail with reference to Examples. The present invention is not limited to these Examples. Besides, "%" means "% by mass" and "part" means "part(s) by mass", unless otherwise specified.

Raw materials used and preparation methods are shown below.

<Colorant>

Red pigment (PR122)
Yellow pigment (PY150)
Blue pigment (PB15:4, PB7)
Black pigment (PB7)
White pigment (PW6)

<Pigment Dispersant>

PB822: manufactured by Ajinomoto Fine-Techno Co., Inc.

Solsperse 4000GR: manufactured by The Lubrizol Corporation

Solsperse J180: manufactured by The Lubrizol Corporation

<Photopolymerizable Compound>

Amine-modified oligomer: (C) component, an oligomer of an acrylated amine compound having two photopolymerizable functional groups and two amino groups in a molecule (CN371: manufactured by Sartomer)

3-methyl-1,5-pentanediol diacrylate: (A) component, (trade name: Light acrylate MPD-A, manufactured by Kyoeisha Chemical Co., Ltd.)

Dipropylene glycol diacrylate: (A) component, (trade name: DPGDA, manufactured by Daicel-Allnex Ltd.)

Hexanediol diacrylate: (A) component, (trade name: Viscoat #230, manufactured by Osaka Organic Chemical Industry Co., Ltd.)

Phenoxyethyl acrylate: (D) component, (trade name: SR339A, manufactured by Sartomer)

Benzyl acrylate: (D) component, (trade name: Viscoat #160, manufactured by Osaka Organic Chemical Industry Ltd.)

Acryloyl morpholine: (B) component, (trade name: ACMO, manufactured by KJ Chemicals Corporation)

Vinyl caprolactam: (B) component, (trade name: V-CAP, manufactured by ISP Japan Co., Ltd.)

Ethoxylated pentaerythritol tetracrylate: (trade name: SR494, manufactured by Sartomer)

Polyethylene glycol (600) diacrylate: (trade name: SR610, manufactured by Sartomer)

Trimethylolpropane triacrylate: (trade name: SR351, manufactured by Sartomer)

<Photopolymerization Initiator>

TPO: 2,4,6-trimethylbenzoyl diphenyl phosphine oxide (manufactured by Lamberti S.p.A.)

<Sensitizer>

DETX: 2,4-diethylthioxanthone (manufactured by Lambson Ltd.)

<Polymerization Inhibitor>

MEHQ (hydroquinone monomethyl ether)

HQ (hydroquinone)

<Leveling Agent>

BYK-331 (polyester-modified polydimethylsiloxane, manufactured by BYK-Chemie)

Example 1. Cyan Ink Composition

According to the compounding formulation (% by mass) shown in Table 1, a pigment (PB15:4), a pigment dispersant (PX4701), and a photopolymerizable compound (amine-modified oligomer, hexanediol diacrylate, phenoxyethyl acrylate, vinyl caprolactam) were compounded, and the obtained mixture was dispersed using an Eiger mill (using a zirconia bead having a diameter of 0.5 mm as a medium) to obtain a conc base. The obtained conc base was compounded with each component so as to have the compounding formulation shown in Table 1, and stirred and mixed to obtain an ink composition in Example 1.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment | | | | | | | | | | | |
| PY150 | — | — | — | — | — | — | — | — | — | — | 2.56 |
| PR122 | — | — | — | — | — | — | — | — | — | 3.28 | — |
| PB15:4 | 2.00 | 2.00 | 2.00 | 2.00 | 2.00 | 2.00 | 2.00 | 2.00 | 2.00 | — | — |
| PB7 | — | — | — | — | — | — | — | — | — | — | — |
| PW6 | — | — | — | — | — | — | — | — | — | — | — |
| Pigment dispersant | | | | | | | | | | | |
| PB822 | 0.80 | 0.80 | 0.80 | 0.80 | 0.80 | 0.80 | 0.80 | 0.80 | 0.80 | 0.30 | 0.30 |
| S24000GR | — | — | — | — | — | — | — | — | — | 1.31 | — |
| SJ180 | — | — | — | — | — | — | — | — | — | — | 1.02 |
| Photopolymerizable compound | | | | | | | | | | | |
| Amine-modified oligomer | 5.50 | 5.50 | 5.50 | 5.50 | 5.50 | 1.00 | 14.00 | 5.50 | 5.50 | 1.00 | 4.00 |
| 3-methyl-1,5-pentanediol diacrylate | — | 20.00 | — | — | — | — | — | — | — | — | — |
| Dipropylene glycol diacrylate | — | — | 20.00 | — | — | — | — | — | — | — | — |
| Ethoxylated pentaerythritol tetracrylate | — | — | — | — | — | — | — | — | — | — | — |
| Polyethylene glycol (600) diacrylate | — | — | — | — | — | — | — | — | — | — | — |
| Trimethylolpropane triacrylate | — | — | — | — | — | — | — | — | — | — | — |
| Hexanediol diacrylate | 51.10 | 31.10 | 31.10 | 51.10 | 51.10 | 65.00 | 41.00 | 51.10 | 41.10 | 63.21 | 51.52 |
| Phenoxyethyl acrylate | 15.00 | 15.00 | 15.00 | 15.00 | — | 5.60 | 16.60 | 23.50 | 15.60 | 5.00 | 15.00 |
| Benzyl acrylate | — | — | — | — | 15.00 | — | — | — | — | — | — |
| Acryloyl morpholine | — | — | — | 14.50 | — | — | — | — | — | — | — |
| Vinyl caprolactam | 14.50 | 14.50 | 14.50 | — | 14.50 | 14.50 | 14.50 | 6.00 | 23.90 | 14.80 | 14.50 |
| Initiator | | | | | | | | | | | |
| TPO | 8.00 | 8.00 | 8.00 | 8.00 | 8.00 | 8.00 | 8.00 | 8.00 | 8.00 | 7.50 | 7.00 |
| Sensitizer | | | | | | | | | | | |
| DETX | 0.50 | 0.50 | 0.50 | 0.50 | 0.50 | 0.50 | 0.50 | 0.50 | 0.50 | 1.00 | 1.50 |

TABLE 1-continued

| | | | | | | | | | | | |
|---|---|---|---|---|---|---|---|---|---|---|---|
| Polymerization inhibitor | | | | | | | | | | | |
| MEHQ (hydroquinone monomethyl ether) | 1.90 | 1.90 | 1.90 | 1.90 | 1.90 | 1.90 | 1.90 | 1.90 | 1.90 | 1.90 | 1.90 |
| HQ (hydroquinone) | 0.20 | 0.20 | 0.20 | 0.20 | 0.20 | 0.20 | 0.20 | 0.20 | 0.20 | 0.20 | 0.20 |
| Leveling agent | | | | | | | | | | | |
| BYK-331 (polyester-modified polydimethylsiloxane) | 0.50 | 0.50 | 0.50 | 0.50 | 0.50 | 0.50 | 0.50 | 0.50 | 0.50 | 0.50 | 0.50 |
| Total | 100 | 100 | 100 | 100 | 100 | 100 | 100 | 100 | 100 | 100 | 100 |
| Viscosity (cps/25° C.) | 12.8 | 12.5 | 13.7 | 14.8 | 10.7 | 10.0 | 18.3 | 13.9 | 11.9 | 12.0 | 13.0 |
| Molar ratio ($M_D/M_B$) | 0.75 | 0.75 | 0.75 | 0.76 | 0.89 | 0.28 | 0.83 | 2.84 | 0.47 | 0.24 | 0.75 |
| Storage stability | ○ | ○ | ○ | ○ | ○ | ○ | ○ | ○ | ○ | ○ | ○ |
| Ejection stability | ○ | ○ | ○ | ○ | ○ | ○ | ○ | ○ | ○ | ○ | ○ |
| Curability | ○ | ○ | ○ | ○ | ○ | ○ | ○ | ○Δ | ○ | ○ | ○ |
| Adhesiveness | | | | | | | | | | | |
| PE | ○ | ○ | ○ | ○ | ○ | ○Δ | ○ | ○ | ○ | ○ | ○ |
| PP | ○ | ○ | ○ | ○ | ○ | ○ | ○ | ○ | ○ | ○ | ○ |
| Abrasion resistance | ○ | ○ | ○ | ○ | ○ | ○ | ○ | ○ | ○ | ○ | ○ |

| | Example | | Comparative example | | | | | | | | |
|---|---|---|---|---|---|---|---|---|---|---|---|
| | 12 | 13 | 1 | 2 | 3 | 4 | 5 | 6 | 7 | 8 | 9 |
| Pigment | | | | | | | | | | | |
| PY150 | — | — | — | — | — | — | — | — | — | — | — |
| PR122 | — | — | — | — | — | — | — | — | — | — | — |
| PB15:4 | — | — | 2.00 | 2.00 | 2.00 | 2.00 | 2.00 | 2.00 | 2.00 | 2.00 | 2.00 |
| PB7 | 2.00 | — | — | — | — | — | — | — | — | — | — |
| PW6 | — | 12.00 | — | — | — | — | — | — | — | — | — |
| Pigment dispersant | | | | | | | | | | | |
| PB822 | 0.80 | 1.20 | 0.80 | 0.80 | 0.80 | 0.80 | 0.80 | 0.80 | 0.80 | 0.80 | 0.80 |
| S24000GR | — | — | — | — | — | — | — | — | — | — | — |
| SJ180 | — | — | — | — | — | — | — | — | — | — | — |
| Photopolymerizable compound | | | | | | | | | | | |
| Amine-modified oligomer | 4.00 | 1.00 | 5.50 | 2.00 | 5.50 | 5.50 | 0.00 | 17.00 | 2.00 | 5.50 | 5.50 |
| 3-methyl-1,5-pentanediol diacrylate | — | — | — | — | — | — | — | — | — | — | — |
| Dipropylene glycol diacrylate | — | — | — | — | — | — | — | — | — | — | — |
| Ethoxylated pentaerythritol tetracrylate | — | — | — | — | — | — | — | — | 16.10 | — | — |
| Polyethylene glycol (600) diacrylate | — | — | — | — | — | — | — | — | — | 16.10 | — |
| Trimethylolpropane triacrylate | — | — | — | — | — | — | — | — | — | — | 26.10 |
| Hexanediol diacrylate | 49.00 | 42.70 | 35.00 | 72.00 | 51.10 | 34.60 | 51.10 | 51.10 | 35.00 | 35.00 | 25.00 |
| Phenoxyethyl acrylate | 15.00 | 16.80 | 31.60 | 1.10 | 25.50 | 11.00 | 20.50 | 3.50 | 15.00 | 15.00 | 15.00 |
| Benzyl acrylate | — | — | — | — | — | — | — | — | — | — | — |
| Acryloyl morpholine | — | — | — | — | — | — | — | — | — | — | — |
| Vinyl caprolactam | 14.50 | 14.80 | 14.00 | 9.00 | 4.00 | 35.00 | 14.50 | 14.50 | 18.00 | 14.50 | 14.50 |
| Initiator | | | | | | | | | | | |
| TPO | 8.00 | 10.00 | 8.00 | 8.00 | 8.00 | 8.00 | 8.00 | 8.00 | 8.00 | 8.00 | 8.00 |
| Sensitizer | | | | | | | | | | | |
| DETX | 3.00 | — | 0.50 | 0.50 | 0.50 | 0.50 | 0.50 | 0.50 | 0.50 | 0.50 | 0.50 |
| Polymerization inhibitor | | | | | | | | | | | |
| MEHQ (hydroquinone monomethyl ether) | 3.00 | 1.00 | 1.90 | 1.90 | 1.90 | 1.90 | 1.90 | 1.90 | 1.90 | 1.90 | 1.90 |
| HQ (hydroquinone) | 0.20 | — | 0.20 | 0.20 | 0.20 | 0.20 | 0.20 | 0.20 | 0.20 | 0.20 | 0.20 |
| Leveling agent | | | | | | | | | | | |
| BYK-331 (polyester-modified polydimethylsiloxane) | 0.50 | 0.50 | 0.50 | 0.50 | 0.50 | 0.50 | 0.50 | 0.50 | 0.50 | 0.50 | 0.50 |
| Total | 100 | 100 | 100 | 100 | 100 | 100 | 100 | 100 | 100 | 100 | 100 |
| Viscosity (cps/25° C.) | 12.7 | 12.3 | 13.5 | 12.6 | 14.0 | 11.2 | 9.7 | 19.9 | 22.1 | 23.5 | 23.2 |
| Molar ratio ($M_D/M_B$) | 0.75 | 0.82 | 1.63 | 0.09 | 4.62 | 0.23 | 1.02 | 0.17 | 0.60 | 0.75 | 0.75 |
| Storage stability | ○ | ○ | ○ | ○ | ○ | ○ | ○ | ○ | ○ | ○ | ○ |
| Ejection stability | ○ | ○ | ○ | Δ | ○ | ○ | ○ | Δ | ○ | ○ | ○ |
| Curability | ○ | ○ | ○ | ○ | Δ | ○ | Δ | ○ | ○ | ○ | ○ |

TABLE 1-continued

| | Adhesiveness | | | | | | | | | | |
|---|---|---|---|---|---|---|---|---|---|---|---|
| PE | ○ | ○ | ○ | X | ○ | ○ | ○ | ○ | X | ○ | X |
| PP | ○ | ○ | ○ | X | ○ | ○ | ○ | ○ | X | ○ | X |
| Abrasion resistance | ○ | ○ | Δ | ○ | ○ | Δ | ○ | ○ | ○ | Δ | ○ |

Examples 2 to 13, Comparative Examples 1 to 9

Each ink composition was prepared by the similar method as in Example 1 according to the respective compounding formulation shown in Table 1.

<Evaluation on Ink Composition and Printed Matter>

Using the ink compositions in Examples 1 to 13 and Comparative examples 1 to 9, the molar ratio ($M_D/M_B$) of the total molar amount $M_B$ of the (B) component and the total molar amount $M_D$ of the (D) component, viscosity, storage stability, ejection stability of the ink composition, curability, adhesiveness, and abrasion resistance of the printed matter were evaluated according to the following evaluation methods and evaluation criteria. The results are shown in Table 1.

(Measurement of Viscosity of Ink Composition)

A viscosity of the ink composition was measured using an E-type viscometer (RE100L-type viscometer, manufactured by Toki Sangyo Co., Ltd.) under a condition of a temperature of 25° C. and a rotor rotation speed of 20 rpm.

(Storage Stability)

The ink composition was taken in a glass bottle, sealed, and stored at 70° C. for 7 days, and then the condition thereof was evaluated according to the following evaluation criteria.

○: No thickening and precipitate were observed in the ink composition.

Δ: Thickening and precipitate were observed in the ink composition to an extent that it returned to its original condition when shaken lightly.

X: Thickening and precipitate were observed in the ink composition to an extent that it did not returned to its original condition even when shaken lightly.

(Ejection Stability)

An inkjet recording device equipped with an inkjet nozzle and the ink composition were placed under an ambient temperature of 25° C. for 24 hours, and temperatures of the inkjet recording device and the ink composition were set to be 25° C. Then, they were continuously printed (typed) on a polypropylene sheet using the ink composition at 25° C. to evaluate the ejection stability according to the following evaluation criteria.

○: There was no printing turbulence, and a stable ejection was achieved.

Δ: There was some printing turbulence, but a substantially stable ejection was achieved.

X: There was a printing turbulence, or a stable ejection was not achieved.

(Curability)

The inkjet recording device and the ink composition were placed under an atmospheric temperature of 25° C. for 24 hours, and temperatures of the inkjet recording device and the ink composition were set to be 25° C. Then, they were continuously printed (typed) on a polypropylene sheet and a polyethylene sheet using the ink composition at 25° C., and then cured with a UV-LED light lamp manufactured by Phoseon Technology in a UV accumulated light amount of 180 mJ/cm² at a distance of 2 cm between the lamp and the ink-coated surface. The obtained curable coating film was rubbed with a swab to evaluate the curability based on a degree of removal.

○: Not removed.

Δ: Slightly removed.

X: Removed.

(Adhesiveness)

The coating film obtained by being irradiated with the UV-LED light lamp manufactured by Phoseon Technology at the distance of 2 cm between the lamp and the coated surface of the ink composition under an irradiation condition of 1 second of irradiation time per irradiation (UV accumulated light amount of 60 mJ/cm² per second) until a surface tack disappears was cross-cut with a cutter knife, and a cellophane tape (Registered Trademark) (manufactured by Nichiban Co., Ltd.) was attached to the cut part and peeled off, so that a degree of peeling of the cured film from the polypropylene sheet and the polyethylene sheet was evaluated according to the following evaluation criteria.

○: The cured film was not peeled off.

Δ: The cured film was peeled off, but the peeled area was less than 20%.

X: The cured film was peeled off with the peeled area being 20% or more.

(Abrasion Resistance)

With respect to the cured film obtained in the above-described adhesiveness evaluation, the degree of removal of the cured film from the polypropylene sheet and the polyethylene sheet when the coating film was rubbed with a bleached cloth 500 g×200 times was visually observed using a Gakushin-Type fastness tester (manufactured by Daiei Kagaku Seiki MFG Co., Ltd.), and evaluation was performed according to the following evaluation criteria.

○: The cured film was not removed.

Δ: There was a scratch on the surface of the cured film.

X: The cured film was removed and the sheets were visible.

As shown in Table 1, all of the ink compositions and printed matters in Examples 1 to 13 showed excellent storage stability, ejection stability, curability, adhesiveness, and abrasion resistance of the printed matter. On the other hand, the ink composition in Comparative example 1 having a small content of the (A) component was inferior in abrasion resistance of the printed matter. The ink composition in Comparative example 2 having a large content of the (A) component was inferior in ejection stability and adhesiveness of the printed matter. The ink composition in Comparative example 3 having a small content of the (B) component was inferior in curability. The ink composition in Comparative example 4 having a large content of the (B) component was inferior in abrasion resistance of the printed matter. The ink composition in Comparative example 5 containing no (C) components was inferior in curability. The ink composition in Comparative example 6 having a large content of the (C) component was inferior in ejection stability. The ink composition in Comparative example 7 containing no (A) components was inferior in adhesiveness of the printed matter. The ink composition in Comparative example 8 containing no (A) components was inferior in adhesiveness of the printed matter. The ink composition in Comparative Example 9 containing no (A) components was inferior in abrasion resistance of the printed matter.

The invention claimed is:

1. An ink composition for photo-curable ink jet printing, comprising:
- (A) at least one selected from the group consisting of hexanediol acrylate, 3-methyl-1,5-pentanediol diacrylate, dipropylene glycol diacrylate, and hydroxy pivalic acid neopentyl glycol diacrylate;
- (B) at least one of vinyl amide monomer and acryloyl amine monomer;
- (C) an acrylated amine compound having two photopolymerizable functional groups and two amino groups in a molecule; and
- (D) a monofunctional monomer; and a photopolymerization initiator, wherein the monofunctional monomer of the (D) component excludes vinyl amide monomer of the (B) component, wherein a content of the (A) component is 51.10 to 70% by mass in the ink composition for photo-curable ink jet printing, wherein a content of the (B) component is 5 to 20% by mass in the ink composition for photo-curable ink jet printing, wherein a content of the (C) component is 0.1 to 15% by mass in the ink composition for photo-curable ink jet printing, wherein a content of the (D) component is 5 to 16.8% by mass in the ink composition for photo-curable ink jet printing, and wherein a viscosity at 25° C. is 200 mPa·s or less.

2. The ink composition for photo-curable ink jet printing of claim 1, wherein the (B) component comprises at least one of N-vinylcaprolactam and acryloyl morpholine.

3. The ink composition for photo-curable ink jet printing of claim 1, wherein a molar ratio (MD/MB) of a total molar amount MB of the (B) component and a total molar amount MD of the (D) component is 0.1 to 3.

4. The ink composition for photo-curable ink jet printing of claim 1, further comprising a colorant.

* * * * *